Oct. 27, 1959  W. J. BRACKMANN ET AL  2,910,233
APPARATUS FOR OBTAINING STATISTICAL DATA
Filed June 4, 1954  4 Sheets-Sheet 1

FIG. 1

INVENTORS
WILLIAM J. BRACKMANN
LAWRENCE HARRIS
EUGENE R. SCHLESINGER
BY
ATTORNEY

FIG. 3

United States Patent Office 2,910,233
Patented Oct. 27, 1959

2,910,233

APPARATUS FOR OBTAINING STATISTICAL DATA

William J. Brackmann, Tarrytown, Eugene R. Schlesinger, White Plains, and Lawrence Harris, Brooklyn, N.Y., assignors, by mesne assignments, to United Aircraft Corporation, East Hartford, Conn., a corporation of Delaware Application June 4, 1954, Serial No. 434,384

13 Claims. (Cl. 235—151)

Our invention relates to a method and apparatus for obtaining statistical data from random intelligence.

It is desirable in many and varied applications to control or compensate for motions which are incident to a desired motion and caused by disturbances external to the means producing the desired motion. If such a control or compensation is to be achieved, the characteristics of the motion must be determined in order that means can be designed which will properly control the motion. Some of the characteristics which must be determined are, for example, the cumulative distribution functions of the displacement, velocity, and acceleration of the motion, that is, the fraction of time a variable, say the displacement, exceeds fixed values within its range of variation, and the power density spectrum of the motion. In the latter case if this incidental motion or deviation from the desired motion is a periodic function, the methods of Fourier analysis may be employed to resolve the function into its component frequencies. Where, however, the motion is a function which is random or which contains random components so that it is aperiodic, the method of Fourier analysis will not suffice to determine the characteristics of the motion. When it is desired to control or compensate for such an aperiodic or random motion or disturbance, resort must be had to statistical methods to determine properties of the motion which will aid in the design of a means to control or compensate for the motion.

In modern aircraft it is necessary to provide a stabilized platform for various instruments such as bomb directors and the like. As will readily be understood, the actual motions of an aircraft around its control axes are not steady, unvarying motions at constant angular velocities but are varying motions which are influenced by irregular conditions such as winds, drafts, gusts, the density of the atmosphere through which the plane is flying, the speed of the aircraft, and various other unpredictable and random factors. In the first step of analysis of the composite motion of an aircraft, the composite motion is broken down into component motions about convenient axes, such as, for example, the roll, pitch, and azimuth axes. The roll axis can be established as an axis which is the longitudinal axis of the aircraft in the direction of flight. The pitch axis may be defined as a horizontal axis at right angles to the roll axis. The azimuth axis may be defined as one perpendicular to the pitch axis and extending toward the center of the earth.

In order to compensate for the deviations from the desired motion, a number of servo systems are arranged to stabilize a platform about the respective roll, pitch, and azimuth axes. These "servos" are responsive to deviations of the plane from the desired direction around the various axes. Since these servo mechanisms must respond to the random motions of the aircraft about its various axes, which are deviations from the desired motion, they must be designed to accommodate motions of the character which will be encountered. Therefore, it is desirable for the ready, convenient, and optimum design of the stabilization servos that we know the character of the random motions. If such information is not available, the servos will be properly designed only through accident or chance. By optimum design of a servo we mean one which has a transfer characteristic, or response, which will adequately pass the desired information and yet not be unduly sensitive to unwanted input signals. For example, if the servo has too wide a bandwidth, it will be underdesigned so that it will respond to "noise" and other unwanted input signals and hence it will act not only to compensate for the random motion to be controlled but also to respond to variations which it is not desired to control. If the servo mechanism bandwidth is too narrow, it will not faithfully follow the input signal corresponding to the motion to be controlled. It is obvious that the characteristics of such servo mechanism depend upon the characteristics of the motion to which it is to be responsive. In addition, if such characteristics are known, a servo mechanism can be built which is not only properly responsive but also efficiently designed with a minimum of equipment. This latter consideration is of great importance, since the weight factor is a leading consideration in the design of modern aircraft and equipment for use therein.

The methods of analysis of random data employed in mathematical statistics provide a means by which certain properties of an aperiodic or random motion such as the motion about a selected axis of an aircraft may be determined. From samples of the displacement, velocity, and acceleration of such motion, we can approximate the cumulative distribution functions of these quantities. From statistical moments determined from such functions, various characteristics of the functions may be discovered, as for example, the variance with reference to a measure of central tendency and the peakedness of the function.

The theory of mathematical statistics provides methods whereby a random motion such as of an aircraft such as the motion about a particular axis may be analyzed. From samples taken periodically over an interval of time, data are obtained on the magnitudes of the displacement, velocity, and acceleration of the motion of the aircraft. These data are then used to approximate the cumulative distribution functions of the random motions being analyzed and from these approximations various characteristics of the random motions may be determined.

Under certain conditions, as will be discussed below, the data obtained from the periodic samples can also be used to approximate the power density spectrum of a motion.

Let X be a random variable with a zero mean and a unit standard deviation. Let $g(x)$ be the probability density of X where it is assumed that $g(x)$ is continuous, of bounded variation and $g(x)$ vanishes outside the interval $(-M, M)$ where M is a constant. Then $g(x)$ may be expanded in a Gram Charlier series (H. Cramer, Mathematical Methods of Statistics, Princeton, 1946, pp. 223 ff.).

(1) $\quad g(x) = \phi(x) + \frac{C_3}{3!}\phi^{(3)}(x) + \frac{C_4}{4!}\phi^{(4)}(x) + \ldots$ where $\phi^{(n)}(x)$ denotes the nth derivative of $$\phi(x) = (1/\sqrt{2\pi})(e^{-x^2/2})$$

and the coefficients $C_n$ are particular functions of the moments of X—the values $C_{2\nu}$ depending only on the even moments and the values $C_{2\nu+1}$ depending only on the odd moments.

The power spectrum density is symmetrical about zero so that all odd moments vanish and $C_{2\nu+1}=0$ for all $\nu$. Thus if $\omega=2\pi f$ is the angular frequency of the motion and $V_n$ is the variance of the $n$th derivative of the motion, then in the above series:

$$(2) \quad x = \frac{\omega}{\sqrt{\dfrac{V_1}{V_0}}}$$

$$(3) \quad C_4 = \frac{V_0 V_2}{V_1^2} - 3$$

$$(4) \quad C_6 = \frac{V_0^2 V_3}{V_1^3} - \frac{15 V_0 V_2}{V_1^2} + 30$$

and the derivatives $\phi^{(n)}(x)$ can be computed with the aid of tables of the normal function and its derivatives. A graph of the power spectrum of the motion can be made by plotting $g(x/2\pi\sqrt{V_0/V_1})$ versus $f$.

We have invented a method of and apparatus for obtaining statistical data from random signals whereby properties of a selected motion may be determined. The application of this method and apparatus to the motion of an aircraft about one of its roll, pitch, or azimuth axes results in statistical information which assists the designer of a compensating servo mechanism in attaining the optimum design.

One object of our invention is to provide a method and apparatus for obtaining statistical data from random signals.

Another object of our invention is to provide a method and apparatus for recording and analyzing random angular displacements of an aircraft about its roll, pitch, and azimuth axes.

A further object of our invention is to provide a method and apparatus for determining the proper transmission characteristics for a stabilization servo mechanism.

Yet another object of our invention is to provide a method and apparatus for determining the random motion of an aircraft about a selected axis so that a control servo mechanism may be economically designed.

A still further object of our invention is to provide a method and apparatus for determining the statistical properties of a motion to be controlled such that a servo mechanism may be designed which will respond adequately to the motion to be controlled and yet will be selective in its response so that it will not be overly sensitive to noise and unwanted input signals.

Yet a further object of our invention is the provision of a method and apparatus whereby quantitative statements regarding the angular displacements, velocities, and accelerations undergone by an aircraft as well as the power spectrums of the rotational motions may be determined.

Other and further objects of our invention will appear from the following description.

In general, our invention contemplates a method and apparatus for obtaining statistical data from random signals whereby the nature of the motion can be determined. The statistical properties enable us to predict the character of the motion to such an extent that an improved system for controlling the motion may be designed. We first make a voltage record which is a mixture of a voltage which is phase modulated according to the angular displacement of a synchro controlled by the motion and a reference signal of a fixed frequency. We provide means by which such a record of motion about one of the axes of an aircraft may be made while the aircraft is in flight during a particular run. This voltage record is "played back" at a convenient location, such as a laboratory, in which the analyzing equipment is located and fed to a rotation demodulator which converts the record into a slowly varying signal whose amplitude is proportional to the angular displacement of the synchro during the period of the run. This slowly varying signal is differentiated so that signals which are, respectively, the first and second derivatives of the input signal are created. Each of the derivative signals and the input signal are applied to respective voltage comparator and counter systems or they may be selectively applied to a single system. It will be appreciated that the input signal to the differentiators, the first derivative signal, and the second derivative signal correspond, respectively, to the angular displacement, angular velocity, and angular acceleration of the original motion about the selected axis.

The comparator and counter system includes a selected number of comparators which are voltage level networks maintained at respective predetermined voltage levels. For example, ten networks may be maintained at ten levels. Each of the levels is arranged to operate a pulse output circuit when the signal voltage fed into the particular network exceeds the level of this network. As a result, each of the channels of a comparator system triggers its pulse output circuit to produce a number of pulses which is proportional to the time interval or portion of the period of the run during which the input voltage signal exceeds the comparator network voltage level. Associated with each of the pulse output circuits is a counter which counts the total number of pulses. It will be appreciated that we have taken signals, or signals derived from recorded signals, at selected time values and have determined the number of sample values of the signal which exceed certain preassigned levels over a particular time interval. This data can be used to determine an approximation to the cumulative distribution function of the selected variable, such as a signal proportional to displacement, velocity, or acceleration, fed to the comparator system. With this information, statistical properties of the motion during the period of the run can be determined which aid the servo mechanism designer in designing the optimum servo for controlling the effects of motion of the aircraft about the selected axis. One of the comparator levels may be set to a value which is lower than the least value of the input signal so that its associated counter will operate continuously and the ratio of the count of any of the other comparator counters to the count of the continuously operating comparator counter is the percent of the total time of the run the signal exceeds the particular voltage level. A voice channel may be synchronized with the voltage record producing apparatus so that when the record is played back, the voice channel may be replayed and the data obtained from the voltage record in the laboratory correlated with flight conditions existing during the time the record was made.

In the accompanying drawings which form part of the instant specification and which are to be read in conjunction therewith and in which like reference numerals are used to indicate like parts in the various views:

Figure 3 is a schematic view of the detailed electrical circuits included in the block diagram of Figure 2.

Figure 1:
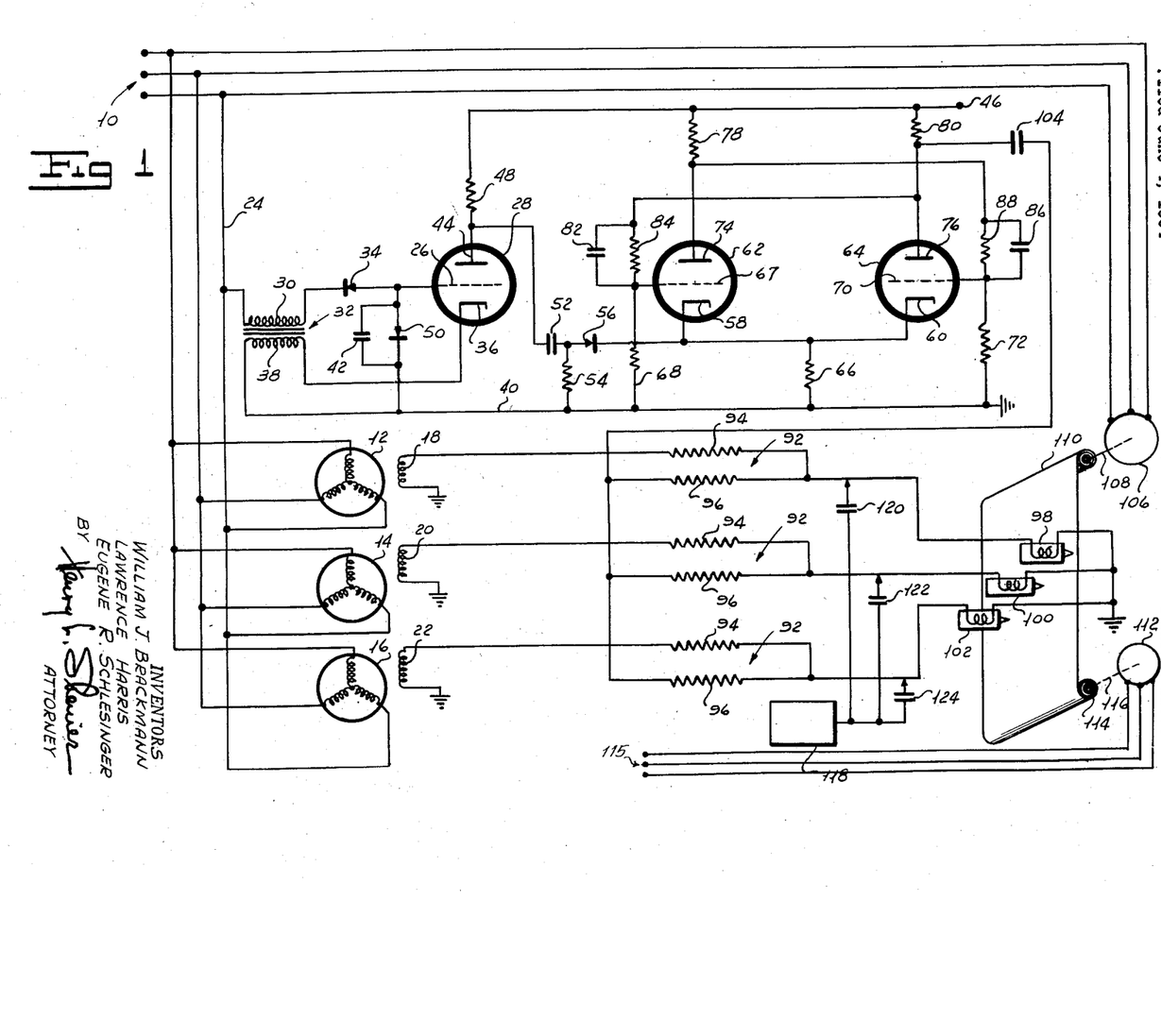
Figure 1 is a schematic view of the electrical circuits of the recording equipment carried by the aircraft for producing a voltage record of its motion about its roll, pitch, and azimuth axes.

More particularly referring now to the drawings, Figure 1 shows the electrical circuits employed in the airborne equipment. A source of three-phase voltage, indicated generally by the reference numeral 10, feeds the respective stator windings of a roll synchro 12, a pitch synchro 14, and an azimuth synchro 16. The stators of synchros 12, 14, and 16 are maintained in position with reference to the respective roll, pitch, and azimuth axes of the aircraft by gyroscopes (not shown), as is well understood in the art. As the respective rotors 18, 20, and 22 of the synchros are displaced according to the roll, pitch, and azimuth deviations of the aircraft, they produce output signals, the phase of each of which is proportional to one of the respective displacements. Any suitable frequency may be selected for the source 10, but for convenience and by way of example only, we have selected a frequency of 400 cycles per second. Therefore, each of the synchro rotors 18, 20, and 22 will have an output which is a phase-modulated, 400-cycle signal whose instantaneous phase depends on the position assumed by the respective synchros.

One phase from the source 10 is applied to a pulsing circuit by a lead 24. The signal is applied to the grid 26 of a triode 28 through a first winding 30 of a transformer, indicated generally by the reference character 32, and a blocking crystal 34 which may be a selenium oxide cell. The cathode 36 of tube 28 is connected to ground through a second winding 38 of transformer 32 and a ground lead 40. The plate 44 of tube 28 is connected to a source of positive potential 46 through a resistor 48. As is understood in the art, triode 28 is a normally conducting tube. The positive half cycle of the input signal will not, however, affect the plate current appreciably, since it is blocked by crystal 34. The negative half cycle of the input tries to cut off the tube, causing a decrease in plate current. The decrease in plate current results in a decrease in the current through winding 38 which is reflected in the grid circuit by winding 30. This regenerative feedback action causes a sharp cutoff of tube 28. When the input voltage goes from negative maximum toward zero, no regenerative action takes place until the tube starts conducting, at which time the regenerative action returns the grid rapidly to its normal potential. When the grid 26 returns to its normal potential, the tube will again conduct its normal plate current after capacitor 42 discharges. The resultant output at the plate 44 of tube 28 will be a substantially square-shaped wave having short rise and fall times of a periodic frequency equal to the input frequency. A selenium cell or similar unidirectional conductor 50 and parallel capacitor 42 are connected between grid 26 and ground 40 to prevent oscillations.

A coupling capacitor 52 and a resistor 54 couple the output of triode 28 to a frequency-dividing circuit. This R-C peaking circuit is selected to have a short time constant so that it will differentiate the output voltage of tube 28 and thereby cause sharp pulses across resistor 54 whenever an input voltage rise or fall is impressed. A divide-by-two circuit includes a blocking crystal 56, which blocks the negative pulses which correspond to fall times, connected to the cathodes 58 and 60 of a pair of triodes 62 and 64. The positive pulse across coupling resistor 54 is applied through crystal 56 across a common cathode resistor 66 of tubes 62 and 64. The grid 67 of tube 62 has a bias resistor 68 and the grid 70 of tube 64 has a bias resistor 72. The respective plates 74 and 76 of tubes 62 and 64 are connected to the source of positive potential 46 through resistors 78 and 80. The grid of tube 62 is connected to the plate 76 of tube 64 through a network including a capacitor 82 and a resistor 84. Similarly, the grid 70 of tube 64 is connected to the plate 74 of tube 62 through a network including capacitor 86 and resistor 88 in parallel. The wave form appearing at the top of common resistor 66, that is, at each of the cathodes 58 and 60, will be a series of narrow positive pulses of a frequency equal to the frequency of the input signal to the dividing circuit. As is understood by those skilled in the art, one of the tubes 62 and 64 is normally conducting. Assuming, for example, that tube 64 is initially conducting, a positive pulse applied to its cathode 60 reduces the plate current drawn by the tube. This decrease in plate current results in a decrease in the voltage drop across the plate resistor 80 which is accompanied by a rise in potential of the grid 67 of the initially nonconducting tube 62 through the parallel R-C circuit including capacitor 82 and resistor 84. The rise in potential of grid 67 causes tube 62 to conduct, increasing the voltage drop across resistor 78. This increase in the voltage drop across resistor 78 is accompanied by a decrease in the potential on grid 70 through the parallel R-C circuit including capacitor 86 and resistor 88. The decrease in potential of grid 70 cuts the plate current of tube 64 further. This switching of conduction from tube 64 to tube 62 is substantially instantaneous so that a sharp wave front is produced by the circuit. On the next sharp input pulse to resistor 66, the reverse cycle is initiated and conduction switches from tube 62 back to tube 64. The output signal from the plate 76 of tube 64 will be a square wave voltage, the width of the pulses of which is equal to the separation between successive input pulses applied to resistor 66. That is, it will be of a frequency equal to half the frequency of the input signal. Since the frequency of source 10 was selected as 400 cycles per second, the frequency of this square wave reference signal will be 200 cycles per second. The frequency dividing circuit also functions to improve the wave form of the square wave reference signal.

We provide a summing network, indicated generally by the reference numeral 92, for each of the roll, pitch, and azimuth synchros. Each of these summing networks includes a resistance 94 and a resistance 96. The phase-modulated, 400-cycle displacement signal from the roll synchro rotor 18 is fed to a roll recording head 98 through the resistor 94 of one of the networks 92. Similarly, the signal from pitch synchro rotor 20 is fed to a pitch recording head 100 through a resistor 94 of a second summing network 92 and the signal from azimuth synchro rotor 22 is fed through a resistor 94 of the third network 92 to an azimuth recording head 102. A coupling capacitor 104 couples the 200-cycle square wave reference signal from plate 76 through the resistor 96 of each of the summing networks 92 to the respective recording heads 98, 100, and 102.

A suitable three-phase synchronous drive motor 106 drives a shaft, indicated schematically as 108, which in turn drives a magnetic recording tape 110 at constant speed by any means known to the art. A two-phase drag motor 112 is supplied from a source of two-phase voltage, indicated generally by reference numeral 115, and drives a viscous drag drum 114 through its shaft 116. Drag drum 114 provides uniform tension on the tape. A radio frequency oscillator 118 simultaneously feeds each of the recording heads 98, 100, and 102 through respective coupling capacitors 120, 122, and 124. It will be appreciated that the output of oscillator 118 will be mixed with a signal which is the sum of the 200-cycle per second square wave and the phase-modulated, 400-cycle outputs of the respective synchros. The oscillator 118 permits the recording heads and the tape to record the 200-cycle square wave and the 400-cycle, phase-modulated wave, and may generate any suitable carrier frequency such as, for example, forty kilocycles.

As the airborne equipment, illustrated in Figure 1 is operated for a period of time T which is the time of a particular run, it records three tracks on tape 110. The tracks will be, respectively, 400-cycle voltage records of the displacements of the roll, pitch, and azimuth rotors, together with 200-cycle timing pulses. If desired, a corresponding sound track may also be recorded on tape 110 so that the voltage records can be correlated with flight conditions at the time the records were made.

Figure 2:
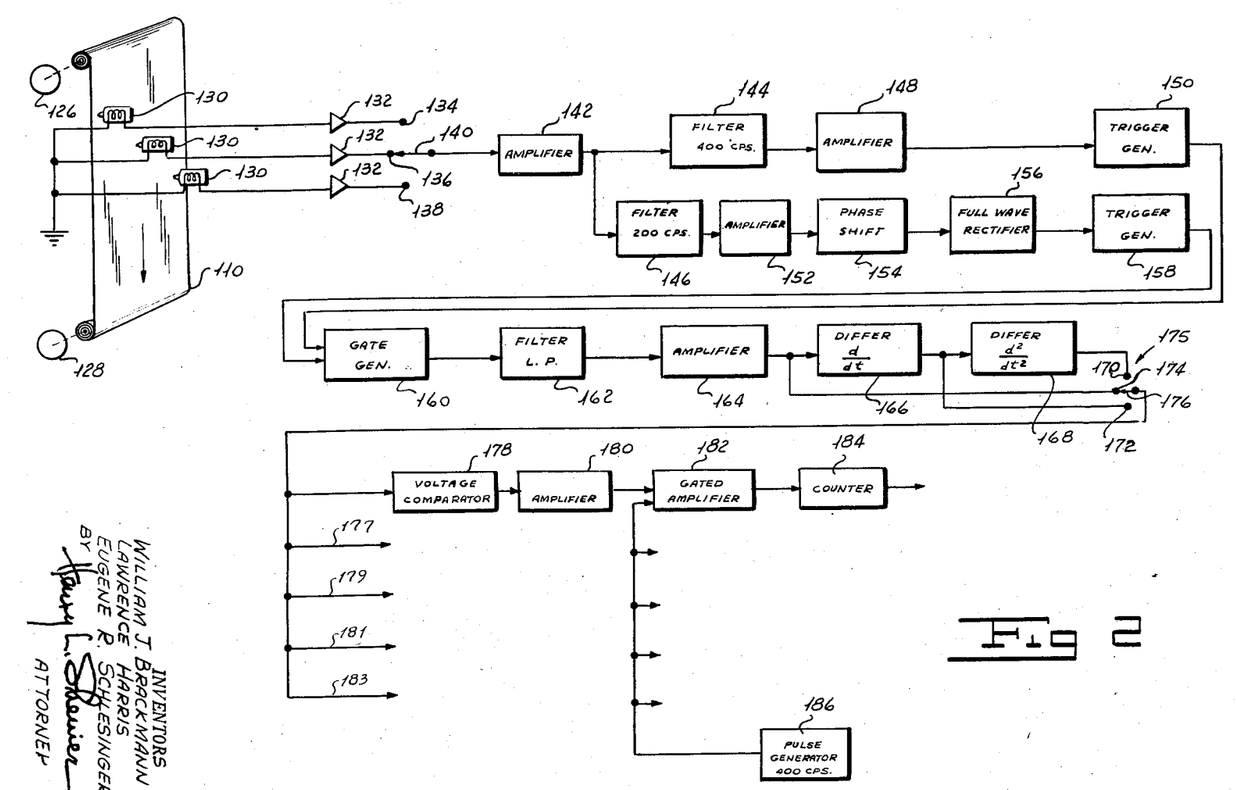
Figure 2 is a schematic view in the form of a block diagram of the analyzing equipment for analyzing the voltage record of the motion of the aircraft about its roll, pitch, and azimuth axes.

Figure 2 is a block diagram of the ground or analyzing equipment of our invention. The tape 110 is played back by a drive motor 126 and a drag motor 128 at the tape speed at which the voltage records were taken. Pickups 130 are arranged over the respective tracks and the outputs are fed each to a respective preamplifier 132. A selecting switch has contacts 134, 136, and 138 to connect the respective roll, pitch, and azimuth pickups to the analyzing circuit. The switch has a selecting arm 140 which may be moved into engagement with any one of the contacts 134, 136, and 138. Assuming the selecting arm 140 engages one of the contacts such as, for example, the pitch contact 136, as shown in Figure 2, the output of the pitch pickup is first fed to a video frequency amplifier 142. As will be clear from an examination of Figure 2, amplifier 142 feeds a 400-cycle filter 144 and a 200-cycle filter 146, each arranged in one of a pair of parallel channels. Filter 144 passes only the selected 400-cycle, phase-modulated signal produced by the rotation of pitch rotor 20. Two-hundred-cycle filter 146 passes only the fundamental component of the 200-cycle reference square wave produced by the pulse forming and frequency dividing circuits of Figure 1. After passing through the filter 144, the phase-modulated signal is amplified by an amplifier 148 and fed to a trigger generator or peaking circuit 150. The fundamental component of the square wave reference signal passes from filter 146 through an amplifier 152 and to a phase shifting network 154. Phase shifter 154 performs a function which will be described in detail hereinafter. Variable time delay network 154 feeds a full wave rectifier 156 which produces pulses in one direction at a frequency which is double the frequency of the 200-cycle wave or 400 cycles. Rectifier 156 is coupled to a trigger generator 158.

Figure 4:
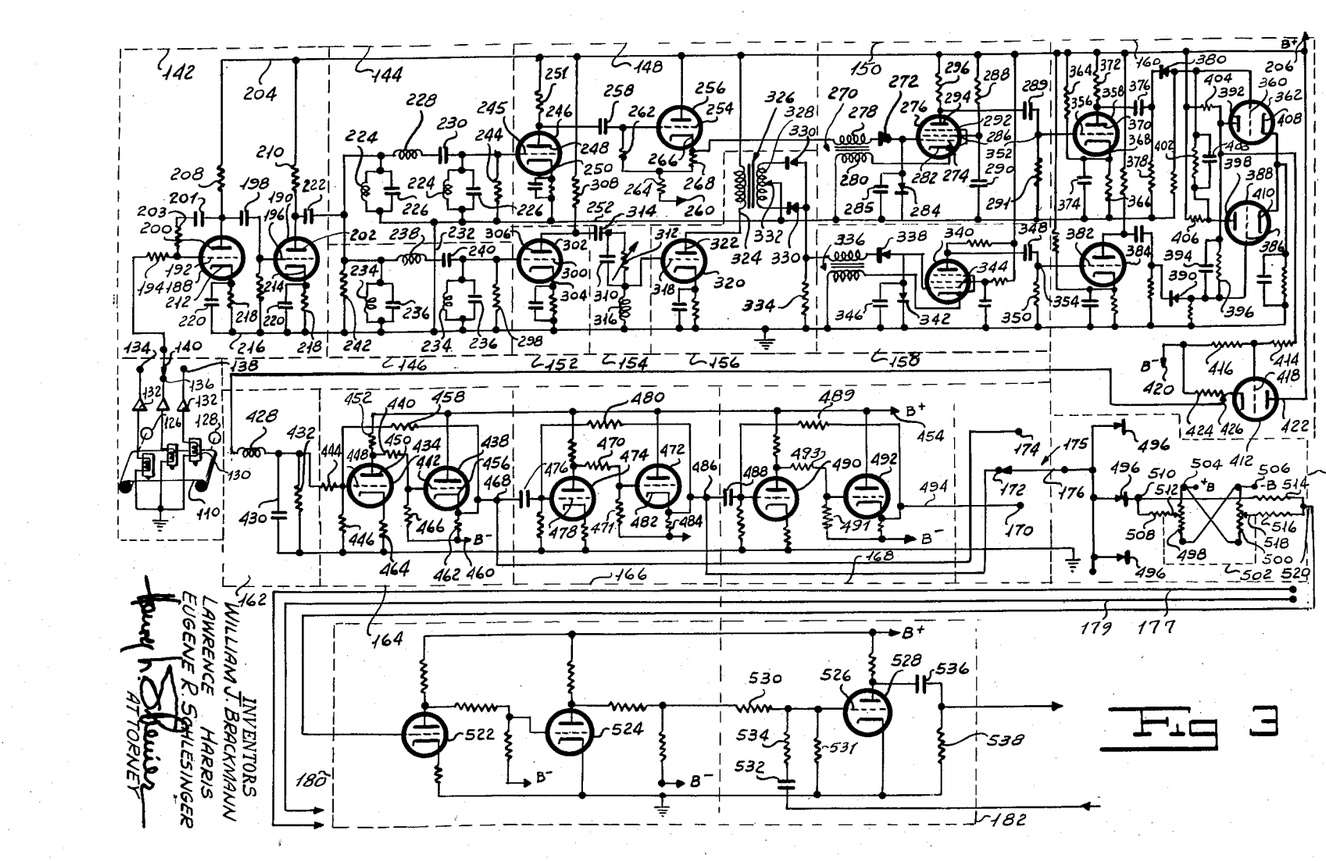
Figure 4 is a plot showing the relationship between the reference voltage and a voltage which is phase modulated in accordance with the motion of the aircraft about a particular axis.

A typical wave form of the 400-cycle per second phase-modulated amplified wave applied to a trigger generator 150 by amplifier 148 is illustrated in broken lines in Figure 4. The output from trigger generator 150 will be a series of pulses corresponding in time to the trigger pulses illustrated in Figure 6. The amplified 200-cycle reference wave is shown in full lines in Figure 4. Full wave rectifier 156 is arranged to convert this wave into a series of negative half waves, as indicated by the dotted lines in Figure 4. The output from trigger generator 158 will be a series of equally spaced pulses corresponding to the trigger pulses shown in Figure 5.

Figure 5:
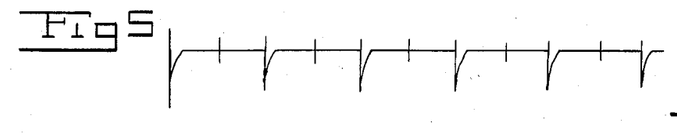
Figure 5 is a plot of the output wave shape of a portion of the analyzing equipment illustrated in Figure 3.
Figures 6, 7:
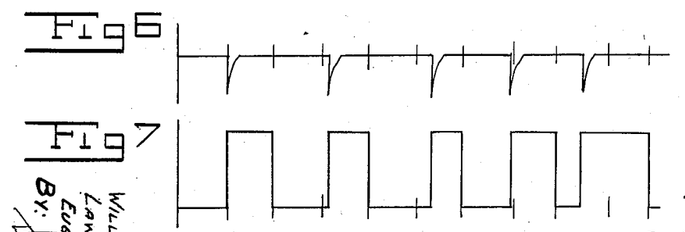
Figure 6 is a plot of the output wave shape of another portion of the analyzing equipment illustrated in Figure 3.
Figure 7 is a plot of the wave form of a further section of the analyzing equipment illustrated in Figure 3.

The outputs of both trigger generators 150 and 158 are fed to a gate pulse generator 160. Gate pulse generator 160 is adapted to be triggered by negative pulses to produce a square wave output signal, as will be explained in detail hereinafter. When a pulse from trigger generator 158, corresponding to a pulse of Figure 5, is fed to gate generator 160, the generator output voltage is cut off. It will be appreciated that the trigger generators 150 and 158 generate respective triggering pulses such that the dissymmetry of the gate generator output square wave is a measure of the phase modulation of the 400-cycle wave. The phase-shifting device 154 can shift the reference 200-cycle wave to ensure that respective pulses from generators 150 and 158 cause the gate generator to produce a symmetrical output signal for the condition of zero phase-modulation. The output of gate generator 160 is represented in Figure 7. It is a series of rectangular pulses, the symmetry of which is a measure of the phase modulation of the 400-cycle wave at a particular time and, therefore, a measure of the original motion. If there is no phase modulation, the square wave of Figure 7 will be symmetrical, since consecutive trigger pulses will be equally spaced in time.

Figure 8:
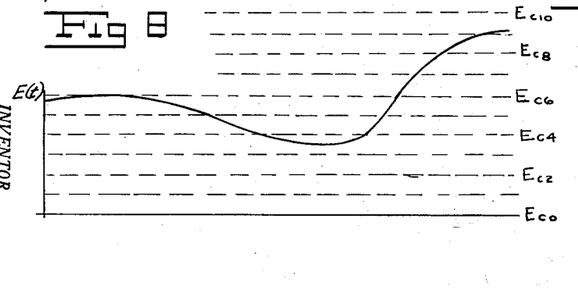
Figure 8 is a plot of the voltage from the low pass filter of the analyzing equipment showing its relation to corresponding voltage levels in the voltage comparator system.

Gate generator 160 feeds a low pass filter 162 which converts the square wave into a slowly varying signal $E(t)$ proportional to the phase displacement of the phase-modulated wave, as is illustrated in Figure 8. This slowly varying signal is amplified by a D.C. amplifier 164 and passes through a first differentiator network 166 and a second differentiator circuit 168. As is well known in the art, differentiator 166 has an output which is the first derivative of the slowly varying signal from amplifier 164 and differentiator 168 supplies the second derivative. A three-way switch, indicated generally by reference numeral 175, has contacts 174, 172, and 170 connected to the respective outputs of amplifier 164, differentiator 166, and differentiator 168. The switch selecting arm 176 may engage a selected one of the contacts 170, 172, and 174 so that a particular output may be analyzed by the voltage comparator and counter system. The equipment from selecting arm 140 to and including amplifier 164 comprises the rotation demodulator of our apparatus.

It will be obvious that since we have phase modulated the 400-cycle wave in accordance with the random motion of the aircraft about a selected axis, the output of amplifier 164 will be a slowly varying D.C. voltage $E(t)$, the value of which is proportional to the displacement of the aircraft around a control axis at any particular time. Similarly, differentiator 166 produces a voltage, the value of which is proportional to the velocity and differentiator 168 a voltage which is proportional to angular acceleration. Depending upon which of these quantities it is desired to analyze at a particular time, arm 176 is moved to a position where it engages the corresponding contact.

The comparator system includes any desired number of voltage level comparators 178. While only one comparator is indicated in the block diagram, any selected number such, for example, as ten may be employed. Each of the voltage comparators is maintained at a different selected voltage level so that it will trigger its output circuit only at times when the input voltage exceeds the voltage level of the comparator. Leads 177, 179, 181, and 183 are connected, respectively, to some of the other voltage comparator and counter channels (not shown). These other channels are identical with the channel including comparator 178 but are maintained at different selected voltage levels. The output circuit of each of the comparators includes an amplifier 180 which feeds a gated amplifier 182 which in turn actuates a counter 184. A pulse generator 186 generates pulses of a selected frequency which may be equal to the base frequency of the phase-modulated signal, in our case, 400 cycles per second. Therefore, each of the gated amplifiers has an input which is a gating signal from one of the voltage comparator channels and a 400-cycle pulse input from generator 186. Each of the gated amplifiers 182 will produce pulses only during the times when the input voltage to its comparator channel exceeds the voltage level at which the associated comparator 178 is maintained. As is understood in the art, counter 184 counts the pulses generated by amplifier 182 so that a measure of the time is obtained during which the input to the respective comparator exceeds the reference voltage level. By selection of proper circuit constants, this information may be correlated with the motion of the aircraft about the selected axis so that we determine, for example, the times during which the displacement of the aircraft about the selected axis exceeds a predetermined value. The same information can, of course, be obtained for velocity or acceleration, depending upon the position of selecting arm 176.

Figure 9:
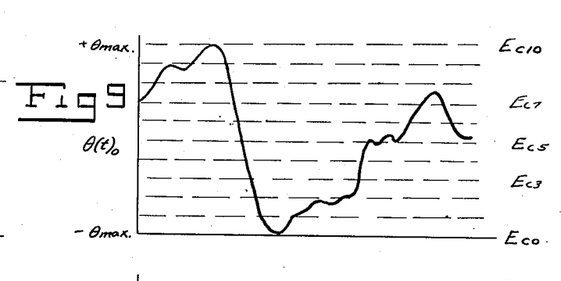
Figure 9 is a plot showing the relation between angular displacement of an aircraft about a selected axis and the corresponding voltage levels of the comparator system.
Figures 10, 11:
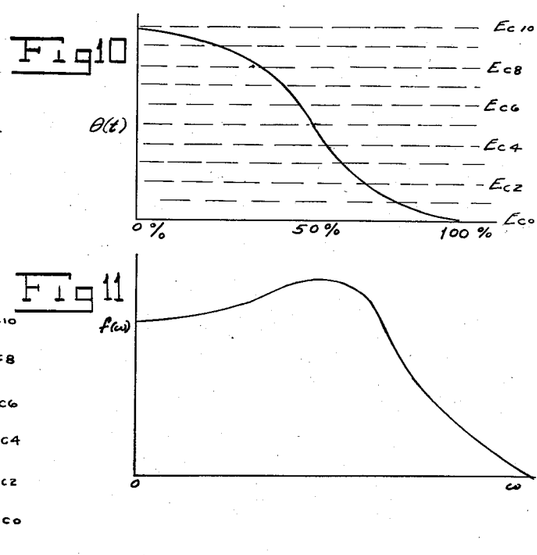
Figure 10 is a plot showing the cumulative distribution function of the displacement of the aircraft about a selected axis and its relation to the comparator voltage levels.
Figure 11 is a plot of the power spectrum of the motion of the aircraft about one of its axes.

Examples of the various levels at which the comparators 178 may be maintained are indicated in Figures 8 to 10 by $E_{c0}$ to $E_{c10}$. It is to be understood that these levels may be varied as desired and that any number of comparator channels may be employed. As mentioned hereinbefore, one of the comparators may be set to a level which is lower than the smallest value of the input signals so that its counter 184 will count continuously and will register a total count which is a measure of the total reproducing interval. The ratio of the count of any one of the other comparators to the continuously operating comparator represents the percentage of the time interval during which the input signal to the comparator exceeds its voltage level.

Figure 9 is a plot of typical random displacements of an aircraft about one of its selected control axis which might be encountered during a run. The various voltage levels at which the counters are maintained are indicated on the plot at corresponding values of displacement. As will be clear from an examination of Figure 9, the range of voltage levels should be selected so that the corresponding range of displacements of the aircraft in either direction from a selected reference is included.

The electrical circuits of the block diagram of Figure 2 are shown in Figure 3. Amplifier 142 includes a pair of tubes 188 and 190. The signal from a selected one of the reproducing heads 130 is impressed on the grid 192 of tube 188 through resistor 194, amplified by tube 188, and passed to the grid 196 of tube 190 through a coupling capacitor 198. The plates 200 and 202 of the respective tubes 188 and 190 are connected through plate resistors 208 and 210 to a line 204 connected to a source of positive potential 206. The cathodes 212 and 214 of the respective tubes are connected to ground line 216 through conventional cathode resistors 218 and by-pass condensers 220. Capacitor 201 and resistor 203 form a correction network which compensates for the undesirable frequency response of the tape.

A coupling capacitor 222 impresses the plate signal voltage of tube 190 on each of the π filter networks 144 and 146. Filter 144 is a conventional band-pass π filter including a pair of parallel shunt arms, each of which is made up of an inductor 224 and a capacitor 226. The shunt arms are coupled by a series branch comprising an inductor 228 and a capacitor 230. Filter 144 is adapted to pass the frequency of the phase-modulated signal which we have selected as 400 cycles. Filter 146 is adapted to pass the 200-cycle reference wave and includes a pair of parallel shunt arms, each of which arms is made up of an inductor 234 and a capacitor 236. The series branch comprises inductor 238 and capacitor 240. The common terminals of these filter networks are connected to ground 216 through conductor 232. The output of tube 190 is impressed on each of the filters 144 and 146 through capacitor 222 and across an input resistor 242.

Filter 144 is terminated in resistor 244. The signal on resistor 244 is impressed on the grid 245 of a tube 246 which amplifiers the signal. Plate 248 of tube 246 is connected to the source of positive potential 206 through a resistor 251. Cathode 250 of tube 246 is tied by conventional means, as illustrated, to a line 252 connected to ground through lead 232. Tube 246 feeds the grid 254 of a second amplifying tube 256 through a coupling condenser 258. The grid 254 is linked to a variable battery terminal, indicated generally by reference numeral 260 through the series connection of grid resistor 262 and resistor 264. Cathode 266 of tube 256 is likewise connected to terminal 260 through cathode resistor 268 and the resistor 264.

The amplified output from amplifier 148, which includes the tubes 246 and 256, is fed to the trigger generating or peaking circuit 150. As is understood in the art, this peaking circuit produces a sharp pulse from an input wave form when the wave form passes through zero in a negative direction. A coupling circuit, including a transformer, indicated generally by the reference numeral 270, and a selenium cell rectifier 272, impresses the amplified 400-cycle, phase-modulated wave on the signal grid 274 of pentode tube 276. One winding 278 of transformer 270 is in the signal grid circuit of tube 276 in series with the blocking rectifier 272, and the other winding 280 of transformer 270 is between the cathode 282 of tube 276 and ground line 252. As is understood in the art, tube 276 is normally conducting, since no bias exists at the moment which will cut the tube off. When the input is positive, it does not affect the plate current, since the input is blocked by crystal 272. When the input signal goes negative, however, it tries to cut the tube off, thus decreasing the plate current. This decrease in plate current is reflected in the signal grid circuit by the transformer 270, thus driving the signal grid further negative. As a result, the tube is sharply cut off. When the input signal goes from negative maximum toward zero, no regenerative action takes place until the tube starts conducting, at which time the regenerative action returns the grid rapidly to its normal potential. When the grid returns to its normal potential, the tube will conduct its normal plate current after capacitor 285 discharges. A unidirectional conducting device 284 which may be a selenium cell or the like is in parallel with condenser 285 and connects the signal grid 274 of pentode 276 to ground and functions to prevent oscillations in the tube output. As is conventional in the case of pentode tubes, the screen grid 286 of the tube is supplied with positive potential by a resistor 288 connected to positive battery terminal 206. Screen grid 286 is connected to ground by a bypass condenser 290. The suppressor grid 292 of tube 276 is linked to cathode 282 in the conventional manner. Plate 294 is supplied with plate potential through a resistor 296 connected to positive battery terminal 206. The trigger pulses generated in the peaking circuit 150 will be spaced at varying intervals, depending upon the phase modulation of the 400-cycle wave.

The output peaking circuit of the trigger generator includes a capacitor 289 and a resistor 291. This R-C circuit is selected to have a very short time constant so that the resultant output wave of the peaking circuit 150 will include a series of sharp positive pulses corresponding in time to the pulses shown in Figure 6.

Filter 146 is terminated in an output resistor 298 which is the input resistor to the grid 300 of an amplifier tube 302. The cathode 304 of tube 302 is grounded to line 216 by conventional means, as shown. Plate potential to plate 306 is supplied through plate resistor 308 from the positive battery terminal 206. The amplified 200-cycle reference signal is fed through coupling capacitor 314 to a phase shift network including a capacitor 310 in parallel with a variable resistor 312 and a series resistor 316, which also functions as a connection between grid 318 of a triode 320 and ground. The phase-shifted, 200-cycle wave appears across resistor 316 and thereby appears at the grid 318 of triode 320. The plate 322 of triode 320 is supplied with positive potential through the primary winding 324 of a transformer, indicated generally by the reference character 326. The circuit of the secondary 328 of transformer 326 includes a full wave rectifier comprising a pair of crystals 330 which may be selenium oxide cells or the like and a center tap 332 to ground. The output of the secondary circuit of transformer 326 is a full wave rectified signal appearing across resistor 334.

Resistor 334 feeds a trigger generator 158 which is identical with the trigger generator 150. It includes an input circuit which is a feed-back transformer, indicated generally by reference character 336 and a unidirectional device 338 tied to the signal grid 344 of pentode 340. As was the case with trigger generator pentode tube 276, tube 340 is provided with a crystal 342 and a condenser 346 in parallel between its signal grid 344 and ground to prevent oscillations. The remaining elements of pentode 340 are connected in a conventional manner similarly to corresponding elements of tube 276. The output circuit of tube 340 includes capacitor 348 and resistor 350. This R-C peaking circuit is chosen to have a very small time constant so that, as is understood in the art, the voltage across resistor 350 will be a series of sharp pulses. It is to be noted that we arrange rectifiers 330 to produce a voltage across resistor 334 which is a series of negative half waves, as indicated by the dotted line in Figure 4. As a result, the trigger generator 158 will produce a series of equally spaced trigger pulses corresponding in time to the pulses shown in Figure 5.

The series of pulses across resistor 291 is fed to grid 356 of tube 358 of gate generator 160, and the trigger pulses across resistor 350 are fed to grid 382 of tube 384 of gate generator 160. A pair of resistors 364 and 366 are connected in series between battery terminal 206 and ground to form a voltage divider whereby proper bias is applied to the cathode 368 of tube 358. Plate 370 is supplied with plate voltage through resistor 372 and a condenser 374 in parallel with resistor 366 reduces negative feedback by passing the high frequencies. The output circuit of tube 358 includes a capacitor 376 and a resistor 378, the values of which may be selected to provide a small time constant so that the input signal to tube 358 may be further sharpened in the tube output voltage wave. Tube 384 is connected in a manner similar to tube 358, as indicated.

It will be apparent that the positive pulses across resistor 291 are inverted by tube 358 to produce the series of trigger pulses illustrated in Figure 6. Similarly, the equally spaced positive reference pulses appearing across resistor 350 are inverted by tube 384 to produce the series of pulses illustrated in Figure 5.

The grid 360 of a triode 362 is connected to the plate 398 of a second triode 388 by a parallel R-C circuit including a resistor 402 and a capacitor 400. Similarly, the grid 386 of tube 388 is connected to the plate 392 of tube 362 by a parallel R-C circuit including a resistor 396 and capacitor 394. The respective cathodes 408 and 410 of tubes 362 and 388 are common and connected to ground by conventional means, as shown. Plates 392 and 398 are supplied with plate potential through respective resistors 404 and 406. It will be appreciated that tubes 362 and 388 form a bistable multivibrator adapted to produce a square wave output whose symmetry is determined by the position of the trigger pulses from trigger generator 150 relative to the trigger pulses from trigger generator 158. It is apparent that the dissymmetry is a measure of the phase modulation of the square wave output of gate generator 180.

The series of pulses corresponding to the phase-modulated wave appear across output resistor 378 of tube 358 and are illustrated in Figure 6. As is conventional in the case of multivibrators, one of the tubes 362 or 388 is normally conducting. Assuming, as shown, that tube 362 is the initially conducting tube, a negative pulse of the wave of Figure 6 will be passed to the grid 360 of the tube. It is to be noted that a positive pulse would not affect the tube action because it would be blocked by crystal 380. The negative pulse applied to grid 360 causes a drop in the plate current drawn by tube 362 and, therefore, a drop in the current through resistor 404. This drop in current through resistor 404 causes a consequent drop in the voltage across the resistor. The drop in voltage across the resistor results in a rise of the potential on grid 386 of tube 388 so that the tube conducts. When tube 388 conducts, the current through resistor 406 increases and the voltage drop across the resistor consequently increases. This causes a decrease in the potential on grid 360. The result of this action is that tube 362 is cut off and tube 388 cut on. When tube 362 cuts off, the gate generator output voltage rises.

When a pulse of the wave of Figure 5, that is, of the voltage wave across the output resistor of tube 384, is passed to the grid 386 of tube 388 by crystal 390, the reverse of the action described takes place. That is, the tube 388, which had been cut on when a pulse of the wave of Figure 6 was applied to the grid 360 of tube 362, is now cut off and tube 362 cuts on. When tube 362 cuts on, the gate generator output voltage drops. It is to be noted that this switching of conduction back and forth between tubes 362 and 388 takes place substantially instantaneously so that the output voltage wave of the gate generator is a series of rectangular pulses, the width of each of which is a measure of the time between a pulse of the wave of Figure 6 and a corresponding pulse of Figure 5. The output of the gate generator is a series of square waves, the difference in width between positive and negative excursions of each of which is proportional to the amount of phase modulation of the phase-modulated wave at a particular time.

A pair of voltage dividing resistances 414 and 416 are connected between the plate 392 of tube 362 and a variable battery terminal 420 to provide proper bias for the grid 418 of cathode follower tube 412. A cathode resistor 424 has a brush 426 by means of which the output wave of gate generator 160 is connected to filter 162. Brush 426 may be moved up and down along resistor 424 to provide a zero D.C. adjustment which ensures that the output D.C. level of gate generator 160 is zero for the condition of zero phase modulation.

Brush 426 is connected to the low pass filter 162. Filter 162 includes a series inductance 428, a parallel capacitance 430 and an output or terminating resistance 432. The output of low pass filter 162 will be a slowly varying signal E(t) which is proportional to the phase displacement of the 400-cycle input signal. A portion of such a slowly varying signal is shown in Figure 8. A D.C. amplifier including resistance coupled amplifier tubes 434 and 438 amplifies the slowly varying signal. A voltage divider including resistors 440 and 446 feed the output of tube 434 to the grid 442 of amplifier 438. The input circuit to the D.C. amplifier includes a series resistor 444 and a feed-back resistor 458 which are selected to provide a stable amplifier gain. Plate potential is supplied to the plate 450 of tube 434 through a resistor 452 connected to an appropriate source of positive potential 454. The grid 448 of tube 434 is connected to the cathode 456 of tube 438 by a resistor 458 and the cathode of tube 438 is connected to a source of negative potential 460 by resistance 462. Tube 434 includes cathode-to-ground resistor 464. Resistors 440 and 466 form a voltage divider to permit the grid potential to be positioned such that cathode 456 will be at ground when input to amplifier is at ground. The output terminal 468 of amplifier 164 is connected to terminal 174 of selecting switch 175.

The differentiator 166 includes a pair of triodes 474 and 472 coupled by voltage divider formed by resistors 470 and 471 and a capacitor 476 connected to the grid 478 of tube 474. A feed-back resistor 480 connects grid 478 with the cathode 482 of triode 472. Other appropriate connections known in the art are made to supply proper bias to the tubes making up the differentiator. The voltage appearing at the cathode 482 of tube 472 will be, as is understood in the art, the first derivative of the slowly varying D.C. signal which was fed to D.C. amplifier 164. The output terminal 486 of differentiator 166 is connected to a terminal 172 of selecting switch 175.

A second differentiator 168 includes an input capacitor 488 and tubes 490 and 492. This differentiator 168 is identical with the differentiator 166 and produces an output which is the second derivative of the slowly varying D.C. voltage which was amplified by amplifier 164 and differentiated by differentiator 166. The output terminal 494 of differentiator 168 is connected to the third terminal 170 of selecting switch 175. A voltage dividing network including resistors 491 and 493 impresses the output of tube 490 on the grid of tube 492 and a resistor 489 provides feedback to tube 490.

It will be apparent that by moving selecting arm 176 to one of the respective terminals 174, 172, or 170, we may obtain a slowly varying signal, the value of which at any instant is a measure of the phase displacement of the phase-modulated, 400-cycle signal on the voltage record produced by the airborne equipment, the first derivative of that displacement or the second derivative of that displacement. By the selection of appropriate constants, the signal may be correlated with the motion of the aircraft about a selected axis so that $\theta(t) = KE(t)$.

In order to analyze the signals on the various terminals of selector switch 176 and obtain a measure of the time during which the signal exceeds particular selected voltage values and thereby the time during which the phase displacement of the phase-modulated, 400-cycle voltage record signals exceed particular values, we have provided a plurality of comparator and counter channels. As was explained in connection with Figure 2, each of these channels includes a voltage comparator 178, an amplifier 180, a gated amplifier 182, and a counter 184. While only one channel including these components is shown, it will be appreciated that we may employ any number of channels, depending upon the intervals at which we desire to make our comparisons. Referring now to Figure 3, some of the elements of one of the channels have been illustrated in detail, it being understood that the elements shown are representative of all channels. Leads 177 and 179 are, for example, representative of two other channels. Each of the voltage comparators includes an input crystal 496 connected to the selecting arm 176 and a pair of potentiometers 498 and 500, mechanically ganged by suitable means identified by the reference character 502 and connected in parallel across a center-tapped D.C. source having a positive terminal 504 and a negative terminal 506. A resistor 508 is connected between the output terminal 510 of crystal 496 and the brush 512 associated with potentiometer 498. A pair of series connected resistors 514 and 516 are connected between terminal 510 and the brush 518 of potentiometer 500. We have selected the resistances of potentiometers 498 and 500 to be much smaller than the value of any of the other resistors 508, 514, or 516. In addition, the sum of the resistances of resistors 508 and 514 is equal to the value of the resistance 516. If crystal 496 is not conducting, the voltage at a point indicated by the reference character 520 will be zero. It will be apparent also that the crystal will only conduct when the voltage at the input to crystal 496 exceeds the voltage value at terminal 510. That is, by moving the potentiometer brushes up and down by means 502, we may set any reference voltage level at point 510 and thus compare the input voltage to crystal 496 with that voltage. If the input voltage exceeds the selected voltage level, the voltage at point 520 will change from zero to a positive value, as will be understood by those skilled in the art.

The output of each of the voltage comparators is fed to an associated D.C. amplifier 180. Each of the amplifiers 180 includes a pair of conventionally connected amplifying tubes 522 and 524. The amplified voltage from each of the amplifiers 180 is impressed on the grid 526 of a respective gated amplifier tube 528 through a resistor 530. Tubes 522 and 524 are in the linear region of their transfer characteristics and conducting. The arrangement is such that when the grid of tube 522 is at ground, the gated amplifier tube 528 is at cutoff. Pulse generator 186 is selected to produce negative pulses of any convenient frequency. We have selected a frequency of 400 cycles per second. Since such pulse generators are conventional and well known in the art, they have not been illustrated in detail in Figure 3. The negative pulses are, however, coupled into the grid circuit of tube 528 through a series-connected capacitor 532 and resistor 534. When the grid of tube 522 rises because the input voltage at 176 exceeds the comparator voltage at 510, the conduction of tube 522 increases, driving the grid of tube 524 more negative. This reduces the conduction of tube 524, which drives the grid 526 of tube 528, which was at cutoff, positive into a linear region. Now the negative pulses, which were heretofore ineffectual, produce positive output signal pulses across resistor 538. The output circuit of tube 528 includes a series-connected capacitor 536 and resistor 538. Each of the gated amplifiers 182 produces a number of pulses in its output across a resistor 538 which is a measure of the time during which the slowly varying D.C. signal or one of its derivatives exceeds the voltage level of the particular comparator. These pulses are counted by any appropriate counter known in the art and which may include electronic counters which actuate an associated mechanical counter. Such counters are discussed, for example, on pages 9–08, 9–09, 9–13, and 9–14 of the "Electrical Engineer's Handbook," fourth edition, by Pender and McIlwain, published by John Wiley and Sons, Inc.

If we select ten equally spaced voltage levels for our respective comparators, the counters 184 associated with the comparators will register counts which are measures of the time during which the phase of the phase-modulated voltage record signal exceeds each of the particular levels. We may maintain one of the comparators at a voltage level which is lower than the lowest value of the slowly varying signal fed into the comparators so that the counter associated with this comparator will count continuously. In Figure 9 we have shown an example of the displacements about a control axis which might be encountered during a run and have indicated the selected voltage levels at which the counters are maintained at corresponding values of displacement. Then the ratio of the count of any one of the comparator counters to the count of the continuously operating comparator will be the fraction of the time of the run during which the input signal exceeds the level of the particular comparator. From this information we can plot the cumulative distribution curve such as is shown in Figure 10 for angular displacement. Likewise, the cumulative distribution curves for velocity or acceleration could be plotted, depending upon the position of selecting arm 176. In Figure 10, the ordinates are voltages which correspond to the various voltage levels of our comparators. By suitable scale factors which are determined by the circuits employed, the voltage values can be correlated with values of displacement about the particular axes selected, such as the pitch, roll, or azimuth axes so that $\theta(t) = KE(t)$. The abscissas of the curve of Figure 10 are percentages of the total time T of the recording sample. From this curve we may determine during what percentage of time the actual displacement is over any particular value. It will be appreciated, of course, that the resulting curves are approximations, the accuracy of which depends upon the number of voltage levels employed. The greater the number of voltage levels, the more nearly the true distribution curve will be approached. The information given by a family of distribution curves for displacement, velocity, and acceleration about a particular axis is of aid to the designer of servo mechanisms which have the purpose of controlling or compensating for motion about a selected axis. It is to be understood that we may duplicate the analyzing equipment following selecting arm 140 for each of the roll, pitch, and azimuth tracks if desired.

It may also be demonstrated that the approximate power frequency spectrum such as is illustrated in Figure 11 may be obtained from the counter readings. As explained, each of the level counters functions during a run for a time T to trigger its associated gate generator only during the period $0 \leq t \leq T$ so that whenever $E(t) \geq x_j$, the $j$th counter counts at a rate of $b$ counts per second where T is the selected period of the run and $x_j$ is the voltage level of the $j$th counter. Therefore, the voltage $E(t)$ causes the $j$th counter to indicate a number which is proportional to the fraction of time T during which the record is made that the voltage is greater than or equal to $x_j$. The fraction $F_j$ of time T during which the record is made that the voltage $E(t)$ is less than or equal to $x_j$ will therefore be:

$$(5) \qquad F_j = \frac{N_T - N_j}{N_T}$$

where $N_T = bT$ which equals the counter reading of a selected counter operated for the duration of a particular run and $N_j$ equals the reading of the $j$th counter.

Assuming that the probability $P_j$ that $E(t)$ is less than or equal to $x_j$ equals the fraction $F_j$ of the time T that $E(t)$ is less than or equal to $x_j$, then:

$$(6) \qquad F_j = P_j \triangleq \operatorname{Prob}\{E(t) \leq x_j\}$$

Letting $\Delta_j F$ represent the fraction of time that $E(t)$ lies between a pair of selected counter levels $x_j$ and $x_{j-1}$, then:

$$(7) \qquad \Delta_j F = F_j - F_{j-1} = \frac{N_T - N_j}{N_T} - \frac{N_T - N_{j-1}}{N_T} = \frac{N_{j-1} - N_j}{N_T}$$

If we let $\Delta_j P$ represent the probability that $E(t)$ lies between $x_j$ and $x_{j-1}$, then we can write:

$$(8) \qquad \Delta_j P = P_j - P_{j-1} = \Delta_j F = \frac{N_{j-1} - N_j}{N_T}$$

Therefore, the $\Delta_j P$'s may be readily calculated from the level counter readings.

We have seen from Equations 1 to 4 that if we know the variances, we can calculate all the constants $C_n$ and the derivatives $\phi^{(n)}(x)$ to completely determine the power frequency spectrum of the motion about a particular axis. In standard statistical theory, the first moment or mean value of a function is approximated by:

$$(9) \qquad \bar{x} = \sum_{j=-n+1}^{n} \left(\frac{x_j + x_{j-1}}{2}\right) \Delta_j P$$

while the variance is approximated by:

$$(10) \qquad V = \sigma^2 = \sum_{j=-n+1}^{n} \left(\frac{x_j + x_{j-1}}{2}\right)^2 \Delta_j P - \bar{x}^2$$

We are able to write this variance and mean value with finite limits, since the signal is bounded. We have seen from Equation 8 that we can calculate the $\Delta_j P$'s from the level counter readings. Substituting Equations 8 and 9 in Equation 10, we can write:

$$(11)$$
$$V_\nu = \sigma_\nu^2 = \left[\sum_{j=-n+1}^{n} \left(\frac{x_j + x_{j-1}}{2}\right)^2 \left(\frac{N_{j-1} - N_j}{N_T}\right)\right] - \left[\sum_{j=-n+1}^{n} \left(\frac{x_j + x_{j-1}}{2}\right)\left(\frac{N_{j-1} - N_j}{N_T}\right)\right]^2$$

and the variances are completely determined by readings on the level counters. Since $V_\nu$ is the variance of the $\nu$th derivative of the function, we can calculate $V_0$ from the level counter readings when the displacement function is being analyzed, that is, when switch arm 176 engages contact 174. Similarly, when switch arm 176 engages contact 172, we are analyzing the first derivative of the function and $V_1$ can be calculated, and when arm 176 engages contact 170, the second derivative is being analyzed so that we can calculate $V_2$. With these variances and a standard normal distribution table, we can determine the approximate power spectrum to obtain the curve of Figure 11. This information is also of aid to the designer of control servo mechanisms.

It is to be noted that the accuracy of the approximation can be increased by employing additional differentiating circuits so that the variances of the higher order derivatives can be calculated. We have found, however, that two differentiators providing a first and second derivative provide a sufficiently close approximation of the power frequency spectrum to obtain satisfactory results.

Figure 9 is a plot of a random displacement about one of the control axes of the aircraft which might be encountered during a particular run. In the figure we have shown the various voltage levels at which the counters are maintained. That is, since each of the counter levels is proportional to a particular value of displacement, we have plotted the counter level voltages at corresponding values of displacement on the plot. As will be apparent from an examination of the figure, the range of voltage between the highest counter level and the lowest counter level should be selected so that the corresponding range of displacement of the aircraft about a control axis in either direction from a selected reference is included in the counter range.

In employing our method of obtaining statistical information from random intelligence, we first arrange the airborne equipment illustrated in Figure 1 in the aircraft and operate the equipment for a time T corresponding to the time of a particular run, such as a bombing run. Each of the respective roll, pitch, and azimuth synchro stators 12, 14, and 16 is stabilized by means of a gyroscope, as is well known in the art, and the rotors 18, 20, and 22 are displaced, respectively, about the roll, pitch, and azimuth axes by the motion of the aircraft. As a result of the displacement, each of the rotors produces a signal which is phase modulated proportionally to the displacement about its respective axis. The reference wave generator including tubes 28, 62, and 64 produces a reference signal of a frequency equal to half the frequency of the phase-modulated signals. This reference signal is added to each of the phase-modulated signals by summing networks 92. The added signals are mixed with the signal generated by oscillator 118 and fed to respective recording heads 98, 100, and 102. The recording heads record three tracks on tape 110, each of which represents the displacement of the aircraft about one of its respective control axes. After such record has been made during the run and when it is desired to analyze the motion of the aircraft, the record must be played back on the analyzing equipment illustrated in Figures 2 and 3. The airborne equipment of Figure 1 and the analyzing equipment of Figure 2 could, of course, be made as a unit. The difficulty of making the analysis during the time of the run, however, and the amount of equipment necessary make it more advantageous to produce a voltage record and play the record at a time and place removed from the place where the motion occurred.

When the motion of the aircraft is to be analyzed, the records on tape 110 are played by reproducing heads 130 and amplified by preamplifiers 132. Each of the respective roll, pitch, and azimuth records could be simultaneously analyzed by duplicating the equipment of Figure 2 for each of the recorded tracks. For convenience, however, we have illustrated only a single analyzing channel and have provided switch 140 for selecting one of the records for analysis at a particular time. The signal produced by the record selected for analysis is amplified by amplifier 142 and fed to filters 144 and 146. Filter 146 selects only the reference wave and passes it to amplifier 152. Phase-shift network 154 is adapted to shift the reference wave along a time axis so that we may ensure a symmetrical square wave output from gate generator 160 for the condition of zero phase modulation. Full wave rectifier 156 doubles the frequency of the reference wave so that it is returned to the frequency of the phase-modulated wave which in our example has been selected as 400 cycles per second. The double frequency reference wave is fed to a trigger generator 158 which generates reference triggering pulses for gate generator 160 which correspond in time to the pulses illustrated in Figure 5.

The channel including filter 144, amplifier 148 and trigger generator 150 selects the 400-cycle, phase-modulated wave and produces a series of pulses corresponding in time to those shown in Figure 6. The pulses from trigger generator 150 mark the beginning of a gate pulse in the output and the reference pulses from trigger generator 158 mark the end of a gate pulse. It will be appreciated that the output of gate generator 160 is a series of square waves, the dissymmetry of each of which is a measure of the amount of phase modulation of the phase-modulated wave at a particular time. This phase modulation is in turn proportional to the displacement of the aircraft around the selected control axis at a particular time.

Low pass filter 162 smooths out the series of pulses from the gate generator to produce a smoothly varying D.C. signal $E(t)$, the value of which is proportional at every instant to the displacement of the aircraft about the selected axis. A portion of this slowly varying signal is illustrated in Figure 8 and may represent, for example, a small fraction of the displacement curve of Figure 9. If it is desired to analyze the displacement function, the slowly varying signal from filter 162 is fed directly to the voltage comparator and counter system through amplifier 164. If it is desired to analyze the velocity or acceleration function, the signal is first passed through differentiator 166 or both differentiators 166 and 168. We have provided the switch 176 whereby the functions may selectively be analyzed, but it will be appreciated that we could duplicate the comparator and counter channels for each of the functions and analyze them simultaneously.

The slowly varying signal or one of its derivatives is fed to a number of comparator and counter channels, each of which channels is maintained at a predetermined voltage level. We select, for example, ten channels at ten levels for comparison with the signal fed to the comparators. Each of the channels includes comparator 178 which produces an output signal only for the period of time during which the slowly varying input voltage exceeds the level of the particular comparator. The output circuit of each of the comparators includes an amplifier 180 and a gated amplifier 182. The gated amplifiers 182 produce a series of gate pulses at a selected rate when the input voltages to their associated comparators exceed the levels of the respective comparators. Each of the channels also includes a counter 184 which counts the number of pulses generated by the respective gated amplifiers 182 during the time T which the analyzing equipment functions. This time T represents the period of the run. As explained hereinbefore, from the counter readings we may obtain the cumulative distribution curve of the function being analyzed, as well as the approximate power spectrum of the motion. The voltage analogues corresponding to displacement, velocity, and acceleration fed to the comparator and counter system can be related to the actual angular quantities by selecting proper known scale factors in the system. That is, we may obtain the cumulative distribution curves of displacement, velocity, and acceleration of the aircraft about each of the respective control axes, as well as the approximate power spectrum of the motion about the respective axes. It will be noted that we have shown only two differentiating circuits 166 and 168 producing the first and second derivatives of displacement. Our approximation of the power spectrum will, therefore, contain only two terms. If desired, we may add additional differentiating circuits and increase the number of terms in our approximation of the power frequency spectrum. This information enables the servo mechanism designer to design a servo mechanism which is capable of controlling or compensating for the type of motion which it will encounter in use. The servo design will be determined from known characteristics of the motion rather than the mere speculation or trial and error procedures.

It is to be understood that the circuits illustrated for accomplishing our method are shown by way of example only. While we have disclosed specific circuitry for accomplishing the objects, many and various modifications could be made without departing from the basic method.

Thus it will be seen that we have accomplished the objects of our invention. We have disclosed a method and apparatus for obtaining statistical data from random signals whereby the properties of a selected motion may be determined. Our method is applicable not only to a periodic motion, but may also be employed where the motion is aperiodic or random. The method and apparatus provide a means which is particularly helpful to designers of servo mechanisms for controlling or compensating for the motion of an aircraft about its respective roll, pitch, and azimuth axes. Our method and apparatus enable the designer to predetermine the proper response for a stabilization servo mechanism of, for example, a bomb director. With our information he may design a servo mechanism which will not be sensitive to unwanted inputs or noise and yet will respond adequately to the inputs to be controlled which are deviations from desired stable condition. More broadly we have provided a method and apparatus whereby quantitative statements regarding the angular displacements, velocities, and accelerations about a particular axis, as well as the power spectrum of a selected rotational motion, may be determined. If desired in our apparatus, a voice channel may be employed which is synchronized with the voltage record producing apparatus so that when the record is replayed, the motion may be correlated with conditions prevailing at the time the record was made.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. Apparatus for obtaining statistical data from random signals including a synchronous device having a stator and a rotor responsive to the displacement of a craft about a selected axis such that the output of said device is a wave of known frequency phase modulated in accordance with said displacement, means for producing a reference wave which is of a frequency different from said known frequency, means for producing a voltage record which is a mixture of said phase-modulated wave and said reference wave, means for reproducing said recorded voltage, means for separating said phase-modulated wave and said reference wave, means for producing a series of pulses from said phase-modulated wave and said reference wave, the symmetry of each pulse of said series being proportional to the phase displacement of said phase-modulated wave at a particular time, means for producing a slowly varying signal from said series of pulses, the instantaneous value of said signal being proportional to the displacement of said aircraft, means for comparing said signal with a selected number of various predetermined voltages, and means for measuring the times during which the signal exceeds each of the respective voltages.

2. Apparatus for obtaining statistical data from random signals as in claim 1 wherein said means for producing the reference voltage includes a pulse generating circuit and a frequency dividing circuit.

3. Apparatus for obtaining statistical data from random signals as in claim 1 wherein said means for separating said phase-modulated wave from said reference wave comprises a pair of filter networks, each of said networks passing a frequency which is the frequency of a respective wave.

4. Apparatus for obtaining statistical data from random signals as in claim 1 wherein said reference wave has a frequency which is half the frequency of said phase-modulated wave and including a frequency doubling circuit for doubling the frequency of said reference wave after said reference wave and said phase-modulated wave have been separated.

5. Apparatus for obtaining statistical data from random signals as in claim 1 wherein said means for producing the series of pulses comprises a pair of trigger generators, each of which trigger generators is associated with a respective one of said phase-modulated and reference waves and adapted to produce respective enabling and disabling pulses and a gate pulse generator actuated by said enabling and disabling pulses.

6. Apparatus for obtaining statistical data from random signals as in claim 1 wherein said means for producing the slowly varying signal includes a low pass filter.

7. Apparatus for obtaining statistical data from random signals as in claim 1 wherein said means for comparing comprises a selected number of comparator and counter channels, each of said channels including a variable voltage comparator and an associated gated amplifier, the arrangement being such that said gated amplifiers produce pulses at a predetermined rate when said signal exceeds the level at which its associated comparator is maintained.

8. Apparatus for obtaining statistical data from random signals as in claim 1 including a zero D.C. level adjustment to ensure that a pulse of said series of pulses is symmetrical for the condition of zero phase modulation.

9. Apparatus for obtaining statistical data from random signals as in claim 1 including a variable time delay network for shifting the phase of said reference wave to ensure that a pulse of said series of pulses is symmetrical for the condition of zero phase modulation.

10. Apparatus for obtaining statistical data from random signals as in claim 1 including means for differentiating said signal.

11. Apparatus for obtaining statistical information from random signals including in combination means for obtaining a voltage record of the displacement of an object with respect to an axis over a period of time, means for replaying said recorded voltage at a point removed in time and space from the occurrence of the displacement, a rotation demodulator for producing a signal from said voltage record, the instantaneous value of said signal being proportional to said displacement and means for sampling said signal at selected levels to obtain information from which the cumulative distribution curve of the displacement may be approximated.

12. In an apparatus for obtaining statistical data from random signals, means for producing a slowly varying signal proportional to the displacement of an object with respect to time, means for differentiating said signal, means for comparing said differentiated signal with a selected number of voltages at various predetermined levels and means for measuring the times during which said differentiated signal exceeds the respective voltages.

13. In an apparatus for obtaining statistical data from random signals, means for producing a slowly varying signal proportional to the displacement of an object with respect to time, means for obtaining the second derivative of said signal, means for comparing the second derivative signal with a selected number of voltages at various predetermined levels and means for measuring the times during which said signal exceeds the respective voltages.

References Cited in the file of this patent

UNITED STATES PATENTS

| | | |
|---|---|---|
| 2,080,186 | Reymond | May 11, 1937 |
| 2,752,589 | De Long | June 26, 1956 |